UNITED STATES PATENT OFFICE.

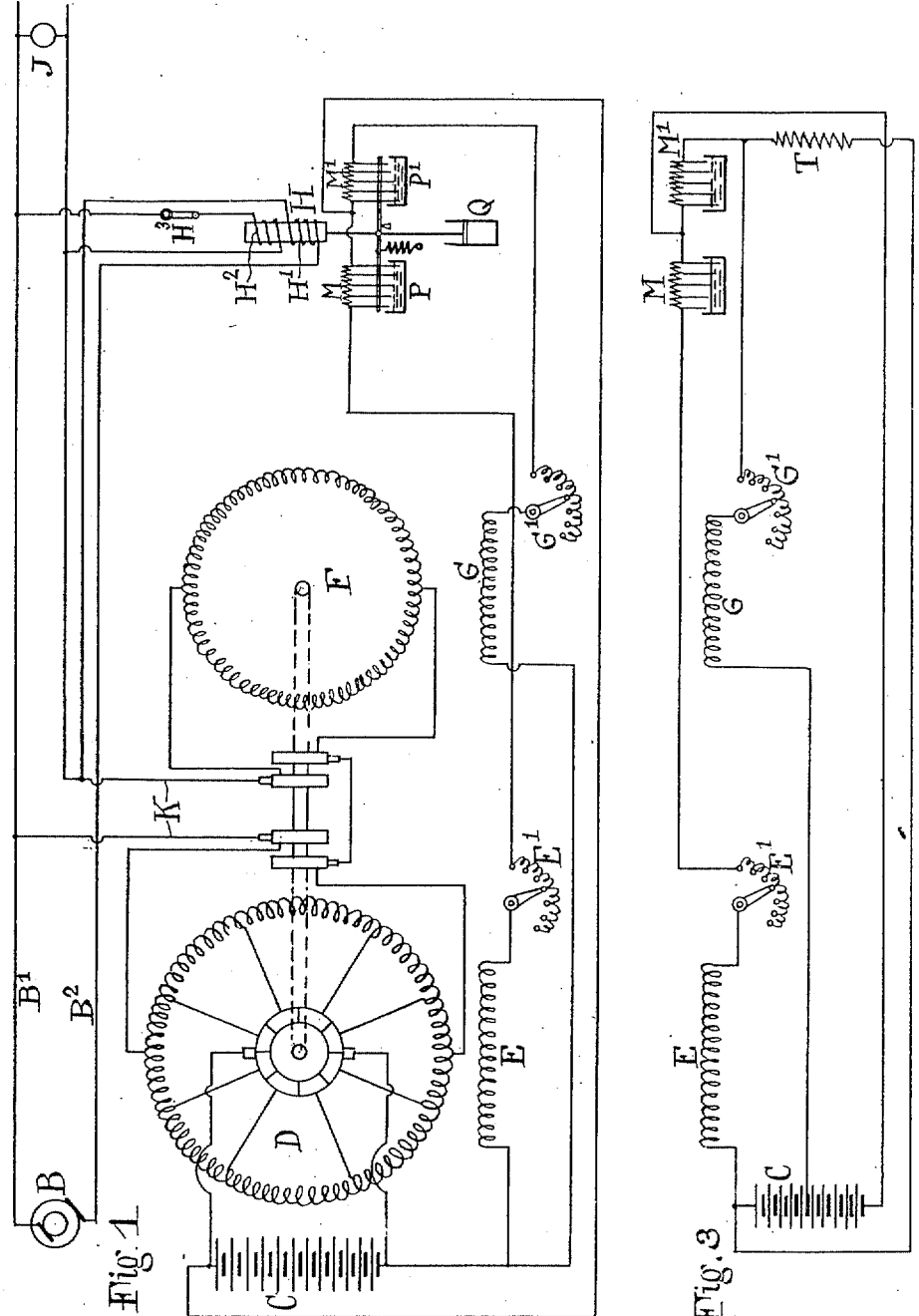

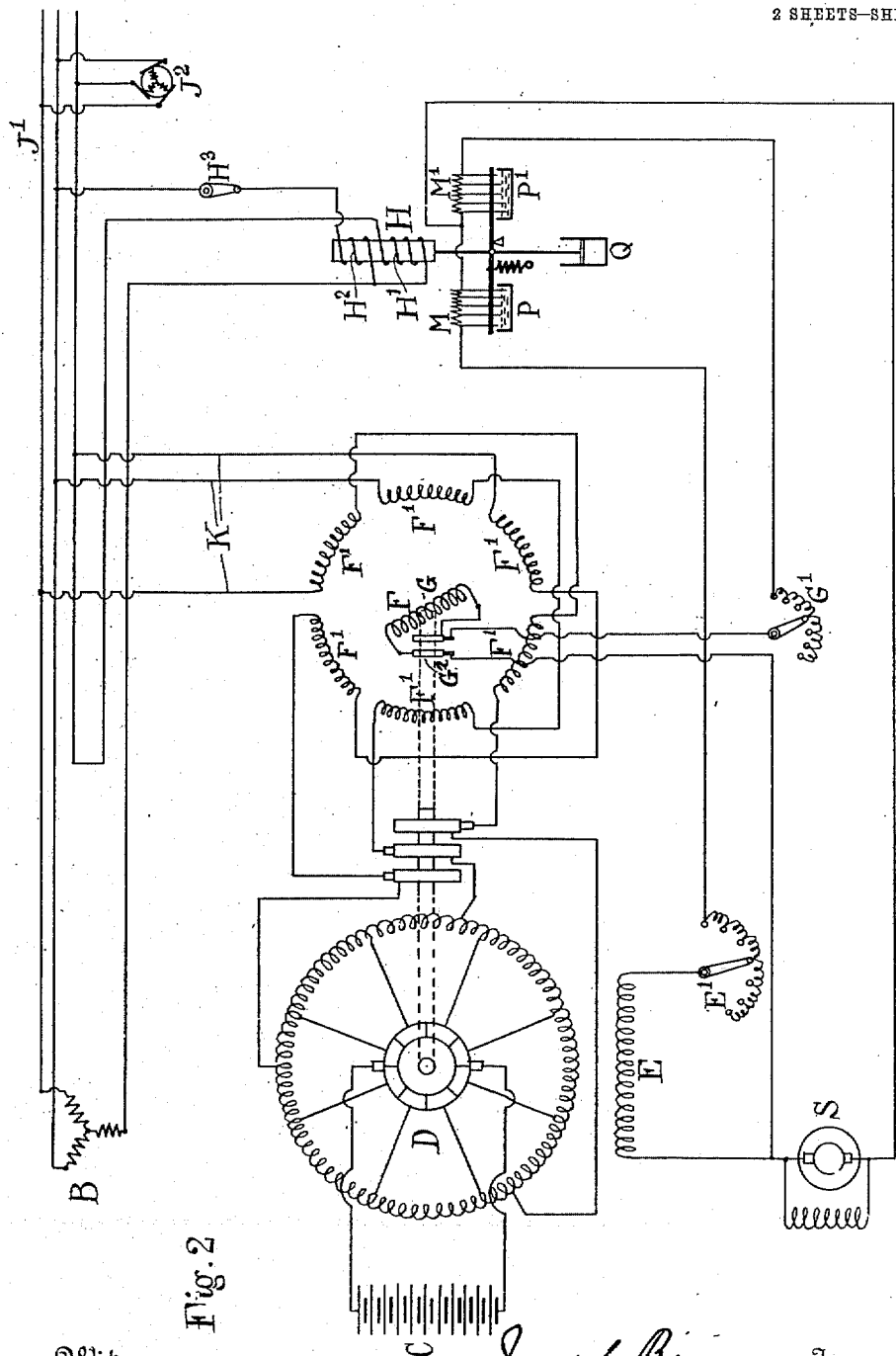

JOSEPH BIJUR, OF NEW YORK, N. Y., ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

984,467.  Specification of Letters Patent.  Patented Feb. 14, 1911.

Application filed March 26, 1908. Serial No. 423,387.

*To all whom it may concern:*

Be it known that I, JOSEPH BIJUR, a resident of the borough of Manhattan, in the city and State of New York, have invented certain new and useful Improvements in Systems of Electrical Distribution, of which the following is a specification, accompanied by drawings.

The invention was primarily designed to enable a storage battery to be used for regulating fluctuations of the load of an alternating current system; but the invention also contemplates more generally the provision of a rotary converter and an alternating current auxiliary means or booster in coöperation therewith, as a means for controlling the transfer of energy from an alternating current circuit to a direct current circuit or for from the direct to the alternating.

Other uses and objects will appear from the following specification and claims.

In the preferred and most complete form of the improvement as embodied in an alternating current system of distribution, a rotary converter and an alternating current booster are interposed between a work circuit supplied from a suitable source of alternating current and a storage battery. Automatic regulating mechanism responsive to changes in the electrical conditions, as for example increase or decrease of the load upon the work circuit above or below the normal, controls the action of the rotary converter and the booster so that the battery supplies energy in the form of alternating current to assist the main source of alternating current supply when the load is excessive, and in turn receives energy from and is charged by the main source of alternating current supply when the load is light. Among other instances where the invention is peculiarly applicable to existing installations is the case of systems of distribution supplied from an alternating current generator and employing rotary converters. Here the invention enables the standard or existing rotary converters to be connected with a storage battery and with an alternating current booster in a manner to regulate the fluctuations of load upon the work circuit.

In the accompanying drawings Figure 1 is a diagrammatic illustration of one form of the system, only a single phase system being shown for the sake of simplifying the diagram. Fig. 2 shows the invention in one of its preferred forms embodied in a three-phase system. Fig. 3 shows in detail a modification of the field circuits of Fig. 2.

In the drawings, the main source of alternating current is indicated as a generator B. At C is the battery.

D and E are respectively the armature windings and field windings of the rotary converter.

F and G are the armature and field windings of an alternating current booster.

H is the regulator which is connected to be electrically responsive to changes of electrical conditions in the work circuit and which acts to regulate the field currents of both the rotary converter and the booster.

In Fig. 1 the work circuit J is supplied from the mains B' B² of the alternating current generator B. The armatures of the rotary converter and of the booster are connected in series across the work circuit so as to receive energy from the main generator when the load is light and to deliver energy to the work circuit when the load is heavy. The storage battery is connected to the commutator brushes of the rotary converter. The field coils of the generator and converter should be excited from a suitable source of supply, as for example, the storage battery C, and each is provided with a manually adjustable resistance E', G' respectively, for varying and adjusting the field excitation at will. The automatic regulator H is also provided for varying the field excitation. It will be convenient to first explain the possible manual operation of the apparatus so far described, assuming the automatic regulator to be out of operation or absent, as would be possible in the case of relatively slow fluctuations that could be suitably controlled by hand. Assuming that the load on the work circuit J is the normal load which the generator B is designed to supply, the battery, converter and booster should be so proportioned as to neither receive nor transmit any energy to or from the work circuit or mains, except that sufficient to keep the rotary converter and booster turning. It will be understood that the booster should be driven synchronously and in unison with the converter and the alternating current source; and this can be accomplished either by the direct shaft connection indicated or by separate means. The booster is shown as excited by the coil G always in the same direction, so that its field is not reversible; but this is not essential, as will be explained later in connection with Fig. 3.

Whenever the load on the main generator falls below the desired limit, the operator can cause the battery to be charged and the load on the alternator so increased as follows: By adjusting the resistance G' he changes the field strength produced by the coil G in the booster in a direction to transmit energy from the main generator to the converter—it being understood that it is possible to connect the booster either to oppose or to act with the converter—the joint alternating-current electro-motive forces of the converter and booster, however, balancing that of the main generator B on normal load. We assume for illustration that the booster and converter both act in the same direction and oppose the passage of energy from the main generator to the battery. In such case the field strength of the booster must now be weakened. Preferably the field current of the rotary converter should be simultaneously strengthened. The rotary converter will now take energy from the mains and will send current into the battery C because its direct-current electro-motive force will have increased. Reversely, when the load is excessive the operator can strengthen the field of the booster and weaken the field of the converter, thereby allowing the storage battery to discharge current through the converter, causing in turn alternating current energy to be supplied by the converter and booster to the work circuit, thereby partially relieving the main generator B.

The construction and operation of the automatic regulator H is as follows: It is provided with a constant pull solenoid or magnet having series coil H' receiving current from the main generator, and a potential coil H² across the work circuit. A switch H³ is shown to indicate that the potential coil may be omitted if it is desired to have the regulator responsive to current changes only. By constant pull solenoid I mean to include conditions where the pull and the re-action of the spring are substantially balanced throughout the range for the normal current. Various adjustments familiar in such apparatus are omitted from the diagram, as they are well known in the art. The solenoid, whether adjusted to be responsive to current or to energy, controls two resistances M, M' in series respectively with the field coils E and G. I have indicated these resistances as being adjustable by means of contact points dipping in mercury cups P, P', but these details are not essential.

At Q is shown a dash-pot for the regulator. It will now be seen that if the system is adjusted for the normal load, any falling off of the load in the work circuit J will cause a decrease of out-put from the main generator and a lessening of the current strength passing through the regulator coil H' or both the coils H' and H², allowing the solenoid core to commence to drop, depressing the left-hand arm of the regulator and raising the right-hand arm, thereby cutting out and reducing resistance in the circuit of the field coil E of the converter and increasing its field strength and simultaneously introducing more resistance at M' into the field circuit G of the booster and weakening the booster. Under these conditions the converter will send direct current to the storage battery and take energy from the main generator B, thus compensating for the decrease of load in the work circuit. If the solenoid is carefully adjusted for constant pull effect so as only to come to rest when the normal conditions in its coils are restored, the adjustment will continue until the main generator is delivering its normal out-put. In the case of over-loading the action will be the reverse of that stated, and it will be understood without repetition.

In Fig. 2, three-phase circuits are shown and the work circuit J' is shown connected to a three-phase motor J². It is assumed that the three mains of the generators are symmetrically loaded and the regulator solenoid is diagrammatically shown with a single series coil and single potential coil, the advantages of different modes of connection being well understood in the art. The armature of the booster is made stationary and the field rotatory, with collector rings G² the converter and booster being connected synchronously as before, the respective sets of armature coils F' being connected in series relation between the armature of the converter and the mains of the alternating current system. In Fig. 2 I have shown the field coils of the converter and booster excited by a direct current exciter S as an alternative to exciting them from the battery C or otherwise.

It will now be understood that the operation of this system shown in Fig. 2 is such that upon normal loads the converter takes only enough current to keep it turning without transmitting energy to either the battery or the work circuit. The manually controlled resistances E' and G' provide for adjusting the field strength to give this condition. Whenever the work falls off the lowering of the solenoid core of the regulator will weaken the field of the booster so as to impress more electro-motive force upon the rotary converter, and the simultaneous strengthening of the field current in the coils E of the converter will coöperate in causing the converter to charge the battery and compensate for the falling off of load on the work circuit. Reversely, when the load is excessive, the booster and converter will cause the battery to discharge energy and will transmit alternating currents, furnishing energy to relieve the main generator.

It will be seen that instead of varying the field strength of the booster from the normal, the field strength might be normally *nil* and be reversible. In Fig. 3 the arrangement of circuits for controlling the reversals as well as the strength of field of the booster are indicated as a modification of Figs. 1 and 2, only the field circuits and their immediate connections being shown. The field coil E of the converter and its connections may remain unchanged. The field coil G of the booster is, however, connected between the middle point of the battery C and the resistance M'; and a resistance T equal to the normal resistance M' is connected in circuit between the same terminal of the resistance M' and one end of the battery, so that the field coil G and its resistance G' are in a bridge circuit balanced across the circuit of the battery passing through the resistances M' and T. When these two resistances are balanced, no current passes through the field coil G; but when the resistance M' is cut down below the normal, current will pass through the field coil G in one direction and when the resistance M' is above the normal it will pass through the coil G in the other direction, thus controlling the direction of the electro-motive forces of the alternating current booster as well as their strength.

It will be understood that the details of the various apparatus shown and described may be widely varied and equivalents substituted without changing the system as a whole, and that also certain features of the system may be employed in coöperation without all the others. It will be seen that in interposing a rotary converter between a direct current circuit and an alternating current circuit or system, I have connected on the alternating side of the rotary converter a means for introducing an alternating current electro-motive force so as to affect the action of the converter. If this principle is broadly new I desire to point out that the booster in coöperation with the rotary converter, controls the relation between the alternating and direct electro-motive forces in such a manner as to make it possible to use such an arrangement to supply alternating circuits from a direct source of current or to supply direct circuits from an alternating source and to control the relationship and transfer of energy between the alternating and direct circuits.

I claim and desire to secure protection for the following:

1. In combination, an alternating current circuit, a direct current circuit, transforming apparatus connected between them, an alternating current booster connected between the transforming apparatus and the alternating current circuit, a suitable field coil for the transforming apparatus, another field coil for the alternating current booster and an electro responsive regulator adapted to control simultaneously the two field coils.

2. A system of distribution having a work circuit and an alternating source of supply therefor, an electro-magnetic regulator having an actuating coil in series between the work circuit and source of supply, a storage battery, a rotary converter connected to the battery, an alternating current booster connected to the work circuit and to the rotary converter, and variable resistances controlled by the regulator and connected with field coils of the rotary converter and of the booster.

3. The combination of a battery or direct current source of supply, a rotary converter connected therewith and with a circuit to be supplied with alternating current, an alternating current booster connected with the converter, and means for varying its action in respect to the converter, comprising two variable resistances in series respectively with field coils of the converter and of the booster, and automatic mechanism for simultaneously varying the two resistances.

In testimony whereof I have signed this specification in the presence of two subscribing witnesses, March 25, 1908.

JOSEPH BIJUR.

Witnesses:
E. Van Zandt,
H. G. Ogden.